(No Model.)

A. D. HILL.
APPARATUS FOR COOLING CREAM, &c.

No. 596,679. Patented Jan. 4, 1898.

Witnesses.
C. F. Kilgore
F. D. Merchant

Inventor:
Adelbert D. Hill.
By his Attorney,
Jas. F. Williamson

UNITED STATES PATENT OFFICE.

ADELBERT D. HILL, OF STANTON, MINNESOTA.

APPARATUS FOR COOLING CREAM, &c.

SPECIFICATION forming part of Letters Patent No. 596,679, dated January 4, 1898.

Application filed February 8, 1897. Serial No. 622,431. (No model.)

*To all whom it may concern:*

Be it known that I, ADELBERT D. HILL, a citizen of the United States, residing at Stanton, in the county of Goodhue and State of Minnesota, have invented certain new and useful Improvements in Apparatus for Cooling Cream, &c.; and I do hereby declare the following to be a full, clear, and exact description of the invention, such as will enable others skilled in the art to which it appertains to make and use the same.

My present invention has for its object to provide an improved apparatus for rapidly cooling liquids, and was especially designed for use in connection with an apparatus set forth and claimed in a companion application filed of even date herewith, Serial No. 622,432, entitled "Pasteurizing apparatus." Both this apparatus and my said pasteurizing apparatus are especially adapted for the treatment of cream or milk.

To the ends above set forth my present invention consists of the novel devices and combinations of devices hereinafter described, and defined in the claims.

The preferred form of my invention is illustrated in the accompanying drawings, wherein, like characters referring to like parts throughout the several views—

Figure 1:
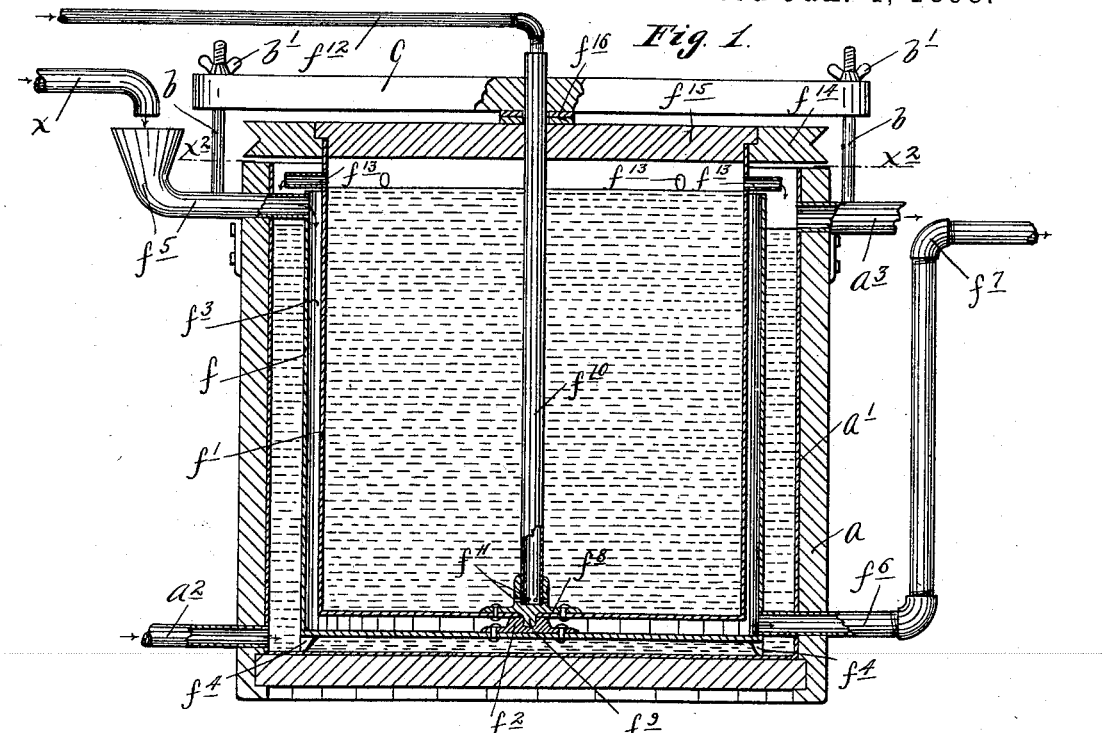
Figure 2:
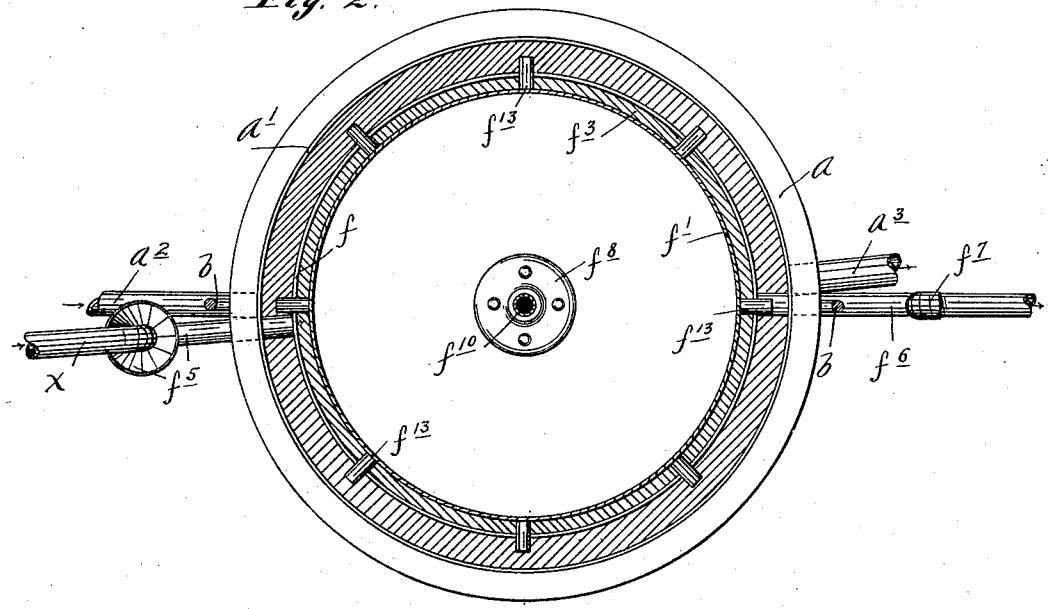

Figure 1 is a view partly in side elevation, with some parts broken away, but principally in central vertical section, illustrating the preferred form of my cooling apparatus; and Fig. 2 is a horizontal section taken substantially on the line $X^2$ $X^2$ of Fig. 1.

$a$ indicates a tank or open vat, preferably constructed of wood and provided with a metallic lining $a'$. An inlet-pipe $a^2$ opens into the lower portion of the vat $a$ and an overflow-pipe $a^3$ opens from the upper portion of the same. A pair of yoke or draw bolts $b$ are secured in vertical positions with their lower ends rigidly attached to the exterior of the vat $a$ at points diametrically opposite to each other. The upper ends of the bolts $b$ are screw-threaded and provided with thumb-nuts $b'$. A removable yoke bar or beam $c$ is adapted to be removably secured in a horizontal position, extending diametrically across and a slight distance above the open upper end of the vat $a$ by means of the yoke-bolts $b$, which are passed through suitable perforations in the ends of said yoke-bar, with the thumb-nuts $b'$ engaging the upper face of the same.

Within the vat $a$ is located a pair of concentric light metal vessels $f$ and $f'$, the outer member $f$ of which is stationary or fixed to the vat, while the inner member $f'$ is mounted for rotary movement on its vertical axis. The inner vessel $f'$ is smaller than the vessel $f$ in diameter, and its bottom is spaced above the bottom of said outer vessel $f$ by means of a bearing block or casting $f^2$, secured centrally to the bottom of the said vessel $f$. It will thus be seen that an annular cooling-chamber $f^3$, with a shallow bottom, is formed between the said vessels $f$ and $f'$. In like manner the bottom of the outer vessel $f$ is spaced apart from the bottom of the vat by means of lugs or feet $f^4$ on said vessel $f$. A water-jacket is thus formed around and under the outer vessel $f$. A funnel-mouthed delivery-pipe $f^5$ passes through the upper portion of the vat $a$ and opens into the upper portion of the cooling-chamber $f^3$. As shown, a supply-pipe $x$, leading from some suitable source of milk or cream supply, such as a pasteurizer, opens into the funnel-mouth of the delivery-pipe $f^5$. A discharge or draw-off pipe $f^6$ opens from the lower portion of the cooling-chamber $f^3$, passes through the vat $a$, and then extends upward nearly but not quite to the top of the said cooling-chamber, where, as shown, it is provided with an elbow-section $f^7$. The altitude of this elbow-section $f^7$ will fix the altitude of the column of milk or cream in the cooling-chamber $f^3$.

To the center of the bottom of the inner and rotary vessel $f'$ is secured a casting $f^8$, which is provided with a depending trunnion or pivot-stud $f^9$, that works in a suitable seat formed in the casting $f^2$.

$f^{10}$ indicates a hollow axial stem or feed-pipe, the upper end of which extends upward through and is journalled in the yoke or bar $c$, and the lower end of which is rigidly secured in a suitable seat formed in the casting $f^8$. A series of radial passages $f^{11}$ open communication between the interior of the feed-pipe $f^{10}$ and the interior of the vessel $f'$. A suitable water-supply pipe $f^{12}$ leads from a source of cold-water supply and terminates in a down-turned end that is swiveled in the upper end of the feed pipe or stem $f^{10}$. A series of radial discharge-nozzles or short pipe-sections $f^{13}$ project and open from the inner rotary vessel $f'$ at points just above the top of the outer vessel $f$ in position to discharge the water which overflows therethrough from said rotary vessel into the annular water-compartment or water-jacketing chamber formed between the vat and the outer vessel $f$.

To the upper end of the rotary vessel $f$ is rigidly secured an annular sheave or pulley $f^{14}$, over which a power-driven belt (not shown) may be passed to impart rotary motion to the said vessel. It will be noted that this sheave $f^{14}$ completely overlies and runs close to the open upper end of the vat, and thus serves as a shield or cover to prevent dirt or dust from dropping into the said vat and annular cooling-chamber. If desired, a removable disk-like cover $f^{15}$, which is perforated at its center to pass over the feed pipe or stem $f^{10}$, may be placed in the open upper end of the rotary vessel $f'$, and between this cover $f^{15}$ and the yoke or bar $c$ one or more washers $f^{16}$ may be placed on the said feed-pipe $f^{10}$.

The operation of the above-described cooling apparatus is substantially as follows: When the device is to be used, the cooling-water should be turned on through the water-supply pipes $a^2$ and $f^{12}$ and the inner rotary vessel $f'$ should be given a slow continuous movement. The milk or cream which, we may assume for the purpose of illustration, is conveyed in a warm state from the pasteurizing apparatus through the pipe $x$ will be discharged into the funnel-mouthed pipe-section $f^5$, from whence it will run into the cooling-chamber $f^3$ and will fill said chamber up to a level determined by the altitude of the elbow-section $f^7$. The cooling-water which is delivered into the rotary vessel $f'$ will, upon reaching the level of the discharge-nozzles or pipe-sections $f^{13}$, overflow therethrough into the annular chamber formed between the vat and the outer tank-section $f$, from whence it will overflow through the overflow-pipe $a^3$. As is a well-known fact, the cooler portions of a liquid will remain or fall to the bottom, while the warmer particles will rise under the action of convection. Hence the draw-off pipe $a^3$, located at the top of the vat, will continually draw off the warmer portions of the cooling-water, while the draw-off pipe $f^6$, opening from the bottom of the cooling-chamber, will draw off the cooler portion of the milk or cream from the said cooling-chamber. The rotary motion of the vessel $f'$ serves to keep the cream or milk in the cooling-chamber and the water within the vessel $f'$ agitated to a slight extent, thereby hastening the cooling action.

In virtue of the fact that the cooling-chamber is formed with very thin walls and bottom portions the liquid which is being cooled will be spread out in a very thin sheet and subjected to an extremely large cooling-surface. The said cooling-chamber being water-jacketed both from within the vessel $f'$ and from without the vessel $f$, the cooling of said liquid will be caused to take place with the greatest possible rapidity.

It will of course be understood that various alterations in the details of construction above described may be made without departing from the spirit of my invention. It will also be understood that my improved cooling apparatus is adapted for use in cooling any and all liquid substances.

The cooler herein described and the pasteurizer herein referred to were designed for use in connection with a separator. The pasteurizer receives from the separator and delivers to the cooler. When the parts are properly proportioned, the pasteurizer and the cooler will perform their respective functions as rapidly as the separator. Hence all the operations are carried on concurrently, and hence as rapidly as separated the cream is also pasteurized and again cooled ready for shipment or storage.

What I claim, and desire to secure by Letters Patent of the United States, is as follows:

1. In an apparatus for cooling liquids, the combination with a pair of concentric vessels, at least one of which is water-jacketed, spaced apart to form a thin annular cooling-chamber, of an inlet for the liquid to be cooled, opening to the upper portion of said cooling-chamber, and an outlet opening from the lower portion of said cooling-chamber and provided with an upturned portion which rises nearly to the top of said cooling-chamber, substantially as and for the purpose set forth.

2. In an apparatus for cooling liquids, the combination with a vat adapted to contain the cooling-water, of a pair of receptacles mounted therein and spaced apart to form a thin annular cooling-chamber, said outer vessel being fixed and said inner member being free for rotary movement, an inlet for the liquid to be cooled, opening into the upper portion of said cooling-chamber, an outlet opening from the lower portion of said cooling-chamber, a water-supply pipe discharging into the inner member of said concentric vessels, overflow-nozzles or radial pipe-sections opening from the upper portion of said inner vessel and discharging into said vat, and a water-overflow pipe opening from the upper portion of said vat, substantially as described.

3. The combination with the vat, of the pair of receptacles concentrically mounted therein and spaced apart to form a thin annular cooling-chamber, an inlet for the liquid to be cooled, opening into the upper portion of said cooling-chamber, an outlet opening from the lower portion of the said cooling-chamber, the axial feed-stem or water-supply pipe journaled at its upper end and opening at its lower end into the inner vessel, the radial discharge-nozzles opening into said vat from the upper portion of said inner vessel, and an overflow-pipe opening from the upper portion of said vat, substantially as described.

4. The combination with the vat, of the pair of vessels concentrically located therein and spaced apart to form the thin annular cooling-chamber, the outer member of which vessels is fixed to the vat and the inner member of which is mounted for rotary movement, an annular sheave or pulley secured to the upper end of said rotary vessel, an inlet for the liquid to be cooled opening into the upper portion of said cooling-chamber, and an outlet opening from the lower portion of said cooling-chamber, and provided with an upturned portion which rises nearly to the top of said cooling-chamber, said parts operating substantially as described.

In testimony whereof I affix my signature in presence of two witnesses.

ADELBERT D. HILL.

Witnesses:
R. J. DRAKE,
T. J. DOUGHERTY.